United States Patent
Saha

(10) Patent No.: US 10,778,639 B2
(45) Date of Patent: Sep. 15, 2020

(54) LINK LOCAL ADDRESS ASSIGNMENT FOR INTERFACES OF OVERLAY DISTRIBUTED ROUTER

(71) Applicant: VMware, Inc., Palo Alto, CA (US)

(72) Inventor: Aviraj Saha, Milpitas, CA (US)

(73) Assignee: VMWARE, INC., Palo Alto, CA (US)

( * ) Notice: Subject to any disclaimer, the term of this patent is extended or adjusted under 35 U.S.C. 154(b) by 72 days.

(21) Appl. No.: 16/202,491

(22) Filed: Nov. 28, 2018

(65) Prior Publication Data

US 2020/0169531 A1 May 28, 2020

(51) Int. Cl.
*G06F 15/16* (2006.01)
*H04L 29/12* (2006.01)
*H04L 12/713* (2013.01)

(52) U.S. Cl.
CPC ........ *H04L 61/2038* (2013.01); *H04L 45/586* (2013.01); *H04L 61/6022* (2013.01); *H04L 61/6059* (2013.01)

(58) Field of Classification Search
CPC ............... H04L 61/2038; H04L 45/586; H04L 61/6022; H04L 61/6059
See application file for complete search history.

(56) References Cited

U.S. PATENT DOCUMENTS

| | | | |
|---|---|---|---|
| 7,216,166 B2 | 5/2007 | Sugauchi et al. | |
| 7,424,104 B2* | 9/2008 | Sprokkereef | H04M 3/4281 379/112.01 |
| 7,653,044 B1 | 1/2010 | Arad | |
| 7,936,766 B2 | 5/2011 | Li et al. | |
| 8,265,059 B1 | 9/2012 | Arad | |
| 8,606,963 B2 | 12/2013 | Bachmann et al. | |
| 8,824,430 B2 | 9/2014 | Ioannidis | |
| 9,049,273 B2* | 6/2015 | Grundemann | H04L 61/6077 |
| 9,967,182 B2* | 5/2018 | Chanda | H04L 45/586 |
| 10,182,035 B2* | 1/2019 | Basler | H04L 63/0236 |
| 10,200,343 B2* | 2/2019 | Chanda | H04L 63/0236 |
| 10,404,760 B2* | 9/2019 | Kolbe | H04L 61/2015 |
| 2004/0059811 A1 | 3/2004 | Sugauchi et al. | |
| 2007/0091862 A1 | 4/2007 | Ioannidis | |
| 2018/0007005 A1* | 1/2018 | Chanda | H04L 63/101 |
| 2018/0109473 A1 | 4/2018 | Boucadair et al. | |

(Continued)

OTHER PUBLICATIONS

Author Unknown, "Configuring a link-local IPv6 address on an interface," Ruckus FastIron Layer 3 Routing Configuration Guide (08.0.70), Month Unknown 2018, 1 page, 53-1005291-01, ARRIS Enterprises LLC, retrieved from http://docs.ruckuswireless.com/fastiron/08.0.70/fastiron-08070-l3guide/GUID-219AFA1-0B94-4224-9041-ADFA10734AE3.html.

(Continued)

*Primary Examiner* — Moustafa M Meky
(74) *Attorney, Agent, or Firm* — Adeli LLP

(57) ABSTRACT

Some embodiments provide a novel method for assigning a unique internet protocol version 6 (IPv6) link-local address to each interface of a software router implementing a plurality of logical interfaces for a corresponding plurality of logical networks. In some embodiments, the method, for each logical interface, determines a logical network identifier for a logical network corresponding to the logical interface and generates the link-local address based on that logical network identifier (e.g., a virtual network identifier (VNI)).

20 Claims, 9 Drawing Sheets

(56) References Cited

U.S. PATENT DOCUMENTS

2018/0295156 A1* 10/2018 Kolbe ................. H04L 12/4633
2019/0141011 A1* 5/2019 Basler .................... H04L 63/20

OTHER PUBLICATIONS

Author Unknown, "IPv6 stateless auto-configuration," Ruckus FastIron Layer 3 Routing Configuration Guide (08.0.60), Month Unknown 2018, 1 page, 53-1004917-04, ARRIS Enterprises LLC, retrieved from http://docs.ruckuswireless.com/fastiron/08.0.60/fastiron-08060-l3guide/GUID-9BEDE74B-36D4-469F-BDC7CE9408CC.
Non-published commonly owned U.S. Appl. No. 16/202,411, filed Nov. 28, 2018, 32 pages, VMware, Inc.

* cited by examiner

LINK LOCAL ADDRESS ASSIGNMENT FOR INTERFACES OF OVERLAY DISTRIBUTED ROUTER

BACKGROUND

With the introduction of internet protocol version 6 (IPv6), each router interface for which IPv6 is enabled must support two IPv6 L3 addresses. The two addresses are a unique global address and a link local address. In stateless address autoconfiguration (SLAAC) the link local address is automatically assigned using a link local prefix (i.e., FE80::/10) and a last 64 bits based on a MAC address of the interface. In a virtualized system including a single interface supporting multiple logical interfaces, SLAAC does not provide a method to distinguish between logical interfaces sharing a same MAC address.

BRIEF SUMMARY

Some embodiments provide a novel method for assigning a unique internet protocol version 6 (IPv6) link-local address to each interface of a software router implementing a plurality of logical interfaces for a corresponding plurality of logical networks. In some embodiments, the method, for each logical interface, determines a logical network identifier for a logical network corresponding to the logical interface and generates the link-local address based on that logical network identifier (e.g., a virtual network identifier (VNI)).

The unique link-local address, in some embodiments, is distributed to the other interfaces on the same layer 2 multicast domain to be used to address the logical interface. In some other embodiments, the unique link-local address is only for internal use and a standard link-local address associated with the shared link layer address is advertised to, and used by, the other interfaces on the same layer 2 multicast domain. Data messages directed to the logical interface using the link-local address, in some embodiments, include internet control message protocol (ICMP) data message, a neighbor discovery protocol (NDP) data message, and a dynamic host configuration protocol version 6 (DHCPv6) data message.

Some embodiments provide a distributed logical router implemented by a plurality of managed physical routing elements (MPREs) executing on a plurality of host machines. Host machines, in some embodiments, host virtual machines or other data compute nodes belonging to multiple logical networks (e.g., logical switches (i.e. logical L2 domains)). In some embodiments, the logical networks are virtual local area networks (VLANs), virtual extensible LANs (VXLANs), or a combination of both. The data compute nodes of some embodiments address all the logical interfaces of the MPRE using a same MAC address (e.g., a virtual MAC address (VMAC)). In some embodiments, the same VMAC is used by all MPREs or for all MPREs for a particular tenant.

Generated link-local addresses for each logical interface of an MPRE, in some embodiments, have the following features: (1) a first 10 bits that identify an address as a link-local address (i.e., 1111 1110 10), (2) a last 64 bits that are the modified extended unique identifier-64 (modified EUI-64), and (3) a set of bits in the middle that are based on an identifier for the logical network corresponding to the logical interface of the MPRE (e.g., a 24-bit VXLAN VNI). The middle set of bits, in some embodiments, immediately follows the first 10 bits, while in others it is placed arbitrarily, but consistently, in the bits between the first 10 bits and the last 64 bits. In some embodiments, identifiers other than the EUI-64 are used and the last set of bits is less than or more than 64 bits long (e.g., a 48-bit MAC address of the interface).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
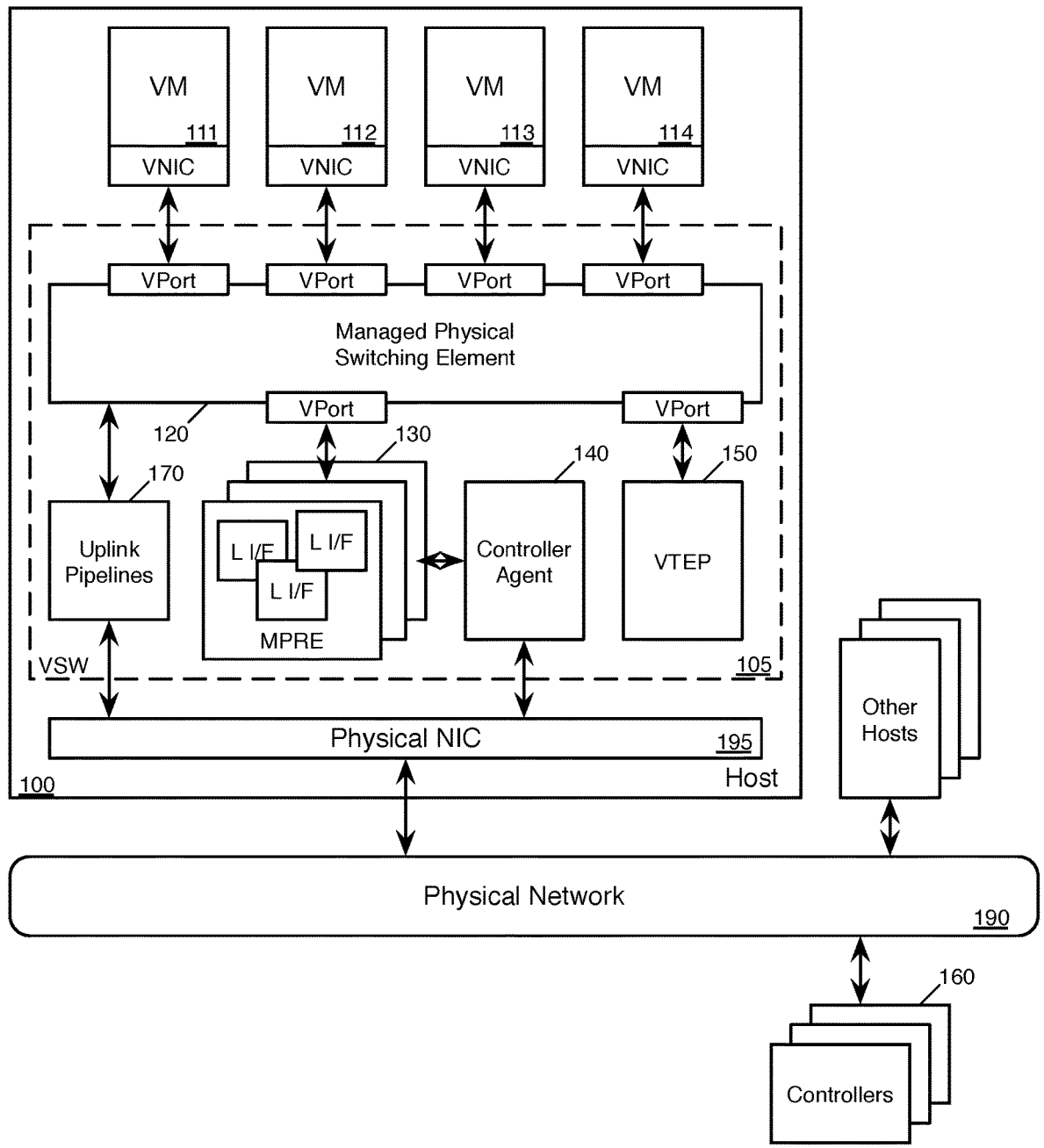
FIG. 1 illustrates a host machine running a virtualization software that includes a virtual distributed router (VDR) component.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for assigning a unique internet protocol version 6 (IPv6) link-local address to each interface of a software router implementing a plurality of logical interfaces for a corresponding plurality of logical networks. In some embodiments, the method, for each logical interface, determines a logical network identifier for a logical network corresponding to the logical interface and generates the link-local address based on that logical network identifier (e.g., a virtual network identifier (VNI)).

The unique link-local address, in some embodiments, is distributed to the other interfaces on the same layer 2 multicast domain to be used to address the logical interface. In some other embodiments, the unique link-local address is only for internal use and a standard link-local address associated with the shared link layer address is advertised to, and used by, the other interfaces on the same layer 2 multicast domain. Data messages directed to the logical interface using the link-local address, in some embodiments, include internet control message protocol (ICMP) data message, a neighbor discovery protocol (NDP) data message, and a dynamic host configuration protocol version 6 (DHCPv6) data message.

Some embodiments provide a distributed logical router implemented by a plurality of managed physical routing elements (MPREs) executing on a plurality of host machines. Host machines, in some embodiments, host virtual machines or other data compute nodes belonging to multiple logical networks (e.g., logical switches (i.e. logical L2 domains)). In some embodiments, the logical networks are virtual local area networks (VLANs), virtual extensible LANs (VXLANs), or a combination of both. The data compute nodes of some embodiments address all the logical interfaces of the MPRE using a same MAC address (e.g., a virtual MAC address (VMAC)). In some embodiments, the same VMAC is used by all MPREs or for all MPREs for a particular tenant.

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

In some embodiments, a virtual distributed router (VDR) runs within a virtualization software (e.g., a hypervisor, virtual machine monitor, etc.) that runs on a computing device that hosts one or more VMs (e.g., within a multi-tenant data center). The virtualization software manages the operations of the VMs as well as their access to the physical resources and the network resources of the host machine. For some embodiments, FIG. 1 illustrates a host machine 100 running a virtualization software 105 that includes a VDR component. The host machine connects to, e.g., other similar host machines, through a physical network 190. This physical network 190 may include various physical switches and routers, in some embodiments.

As illustrated, the host machine 100 has access to a physical network 190 through a physical NIC (PNIC) 195. The host machine 100 also runs the virtualization software 105 and hosts VMs 111-114. The virtualization software 105 serves as the interface between the hosted VMs and the physical NIC 195 (as well as other physical resources, such as processors and memory). Each of the VMs includes a virtual NIC (VNIC) for accessing the network through the virtualization software 105. Each VNIC in a VM is responsible for exchanging packets between the VM and the virtualization software 105. In some embodiments, the VNICs are software abstractions of physical NICs implemented by virtual NIC emulators.

The virtualization software 105 manages the operations of the VMs 111-114 and includes several components for managing the access of the VMs to the physical network (by implementing the logical networks to which the VMs connect, in some embodiments). As illustrated, the virtualization software includes several components, including a virtual switch 120, a virtual distributed router (VDR) 130 (e.g., implemented by a managed physical routing element (MPRE)), a controller agent 140, a VTEP 150, and a set of uplink pipelines 170.

The controller agent 140 receives control plane messages from a controller or a cluster of controllers. In some embodiments, these control plane message includes configuration data for configuring the various components of the virtualization software (such as the virtual switch 120 and the virtual router 130) and/or the virtual machines. In the example illustrated in FIG. 1, the controller agent 140 receives control plane messages from the controller cluster 160 as a L2 data packet from the physical network 190. However, in some other embodiments, the controller agent 140 receives control plane messages from direct data conduits independent of the physical network 190, or through a separate virtual switch. The controller agent and the configuration of the virtualization software are further described in US Patent Publication number 2018/0276013, which is hereby incorporated by reference.

The VTEP (VXLAN tunnel endpoint) 150 allows the host 100 to serve as a tunnel endpoint for logical network traffic (e.g., VXLAN traffic). VXLAN is an overlay network encapsulation protocol. An overlay network created by VXLAN encapsulation is sometimes referred to as a VXLAN network, or simply VXLAN. When a VM on the host 100 sends a data packet (e.g., an ethernet frame) to another VM in the same VXLAN network but on a different host, the VTEP will encapsulate the data packet using the VXLAN network's VNI and network addresses of the VTEP, before sending the packet to the physical network. The packet is tunneled through the physical network (i.e., the encapsulation renders the underlying packet transparent to the intervening network elements) to the destination host. The VTEP at the destination host decapsulates the packet and forwards only the original inner data packet to the destination VM. In some embodiments, the VTEP module serves only as a controller interface for VXLAN encapsulation, while the encapsulation and decapsulation of VXLAN packets is accomplished at the uplink module 170.

The virtual switch 120 delivers network data to and from the physical NIC 195, which interfaces the physical network 190. The virtual switch also includes a number of virtual ports (vPorts) that communicatively interconnects the physical NIC with the VMs 111-114, the VDR 130 and the controller agent 140. Each virtual port is associated with a unique L2 MAC address, in some embodiments. The virtual switch performs L2 link layer packet forwarding between any two network elements that are connected to its virtual ports. The virtual switch also performs L2 link layer packet forwarding between any network element connected to any one of its virtual ports and a reachable L2 network element on the physical network 190 (e.g., another VM running on another host).

The virtual router (VDR) 130 performs L3 routing (e.g., by performing L3 IP address to L2 MAC address resolution) on data packets received from a virtual port on the virtual switch 120. Each routed data packet is then sent back to the virtual switch 120 to be forwarded to its destination according to the resolved L2 MAC address. This destination can be another VM connected to a virtual port on the virtual switch 120, or a reachable L2 network element on the physical network 190 (e.g., another VM running on another host, a physical non-virtualized machine, etc.). In some embodiments, the virtual router 130 includes one or more logical interfaces (LIFs) that each serve as an interface to a particular segment of the network. In some embodiments, each LIF is addressable by its own IP address and serve as a default gateway or ARP proxy for network nodes (e.g., VMs) of its particular segment of the network. As described in detail below, in some embodiments, each LIF of a VDR instance (i.e., a VDR configuration that is replicated across several hosts) is addressable by a same "virtual" MAC address, while each instantiation of the VDR instance (i.e., the VDR instantiation operating on a particular host machine) is also assigned a separate "physical" MAC address.

The uplink module 170 relays data between the virtual switch 120 and the physical NIC 195. The uplink module 170 includes an egress chain and an ingress chain that each performs a number of operations. Some of these operations are pre-processing and/or post-processing operations for the VDR 130. The operations of the uplink module 170 are further described in US Patent Publication number 2018/0276013, which is hereby incorporated by reference.

As illustrated by FIG. 1, the virtualization software 105 has multiple local VDRs for multiple VDR instances. In a multi-tenancy environment, a host machine can operate virtual machines from multiple different users or tenants (i.e., connected to different logical networks). In some embodiments, each user or tenant has a corresponding local VDR instantiation in the host for handling its L3 routing. In some embodiments, though the different VDR instantiations belong to different tenants, they all share a same vPort on the virtual switch 120, and hence a same L2 MAC address. In some other embodiments, each different local VDR instantiation belonging to a different tenant has its own port to the virtual switch.

Figure 2:
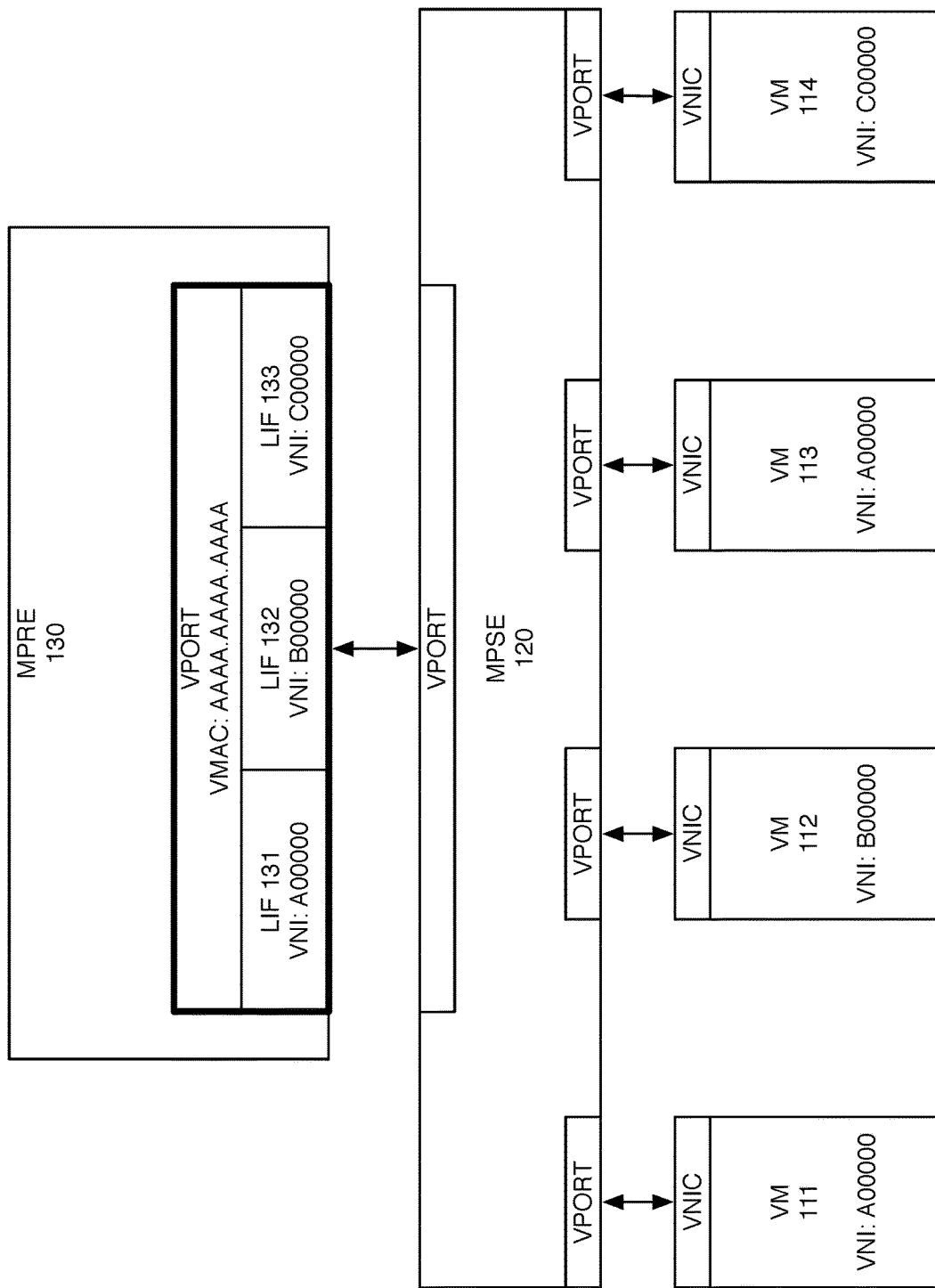
FIG. 2 illustrates an embodiment including a managed physical routing element (MPRE) with multiple logical interfaces for different logical networks that share a media access control (MAC) address, a managed physical switching element (MPSE), and multiple data compute nodes (DCNs) associated with the different logical networks.

FIG. 2 illustrates an embodiment including a managed physical routing element (MPRE) 130 with multiple logical interfaces (LIFs) 131-133 for different logical networks that share a media access control (MAC) address, a managed physical switching element (MPSE) 120, and multiple data compute nodes (e.g., VMs 111-114) in the different logical networks. Elements with similar numbering function as described above in relation to FIG. 1. As discussed above, the MPRE 130 has a single port (with a single MAC address) in communication with MPSE 120. Each VM 111-114 connects to MPSE 120 through a unique port (vport) with a unique (at least within its logical network) MAC address.

In the embodiment of FIG. 2, IPv6 requires a unique link-local address to be assigned to each interface to be used for certain data messages. One method of automatically assigning a link-local address to each logical interface is stateless address autoconfiguration (SLAAC). SLAAC assigns a link-local address based on a MAC address associated with the interface. Specifically, SLAAC uses a 10-bit link-local header (corresponding to FE80, or 1111 1110 10) followed by 54 "0"s and then the modified EUI-64 (the modified 64-bit extended unique identifier) that is based on the MAC address. The modified EUI-64 takes the MAC address (e.g., AAAA:AAAA:AAAA), flips the $7^{th}$ most significant bit (e.g., A8AA:AAAA:AAAA), inserts the bits "FFFE" after the first 24 bits of the MAC address, and then includes the last 24 bits of the MAC address (e.g., A8AA: AAFF:FEAA:AAAA). However, for the embodiment illustrated in FIG. 2, SLAAC assigns a same link-local address to each logical interface of MPRE 130 and data messages addressed to any logical interface 131-133 would be addressed using the same link-local address and could not be distinguished at the MPRE without additional information that is not part of the IPv6 protocol.

For the embodiment illustrated in FIG. 2 (and other similar embodiments using a same MAC address for multiple interfaces), a unique link-local address is generated for each logical interface. Generated link-local addresses for each logical interface of an MPRE, in some embodiments, have the following features: (1) a first 10 bits that identify an address as a link-local address (i.e., 1111 1110 10), (2) a last 64 bits that are the modified extended unique identifier-64 (modified EUI-64), and (3) a set of bits in between the first 10 bits and the last 64 bits that are based on an identifier for the logical network corresponding to the logical interface of the MPRE (e.g., a 24-bit VXLAN VNI). The middle set of bits, in some embodiments, immediately follows the first 10 bits, while in others it is placed arbitrarily (either consistently or inconsistently) in the bits between the first 10 bits and the last 64 bits. In some embodiments, identifiers other than the EUI-64 are used and the last set of bits is less than or more than 64 bits long (e.g., a 48-bit MAC address of the interface).

Figure 3:
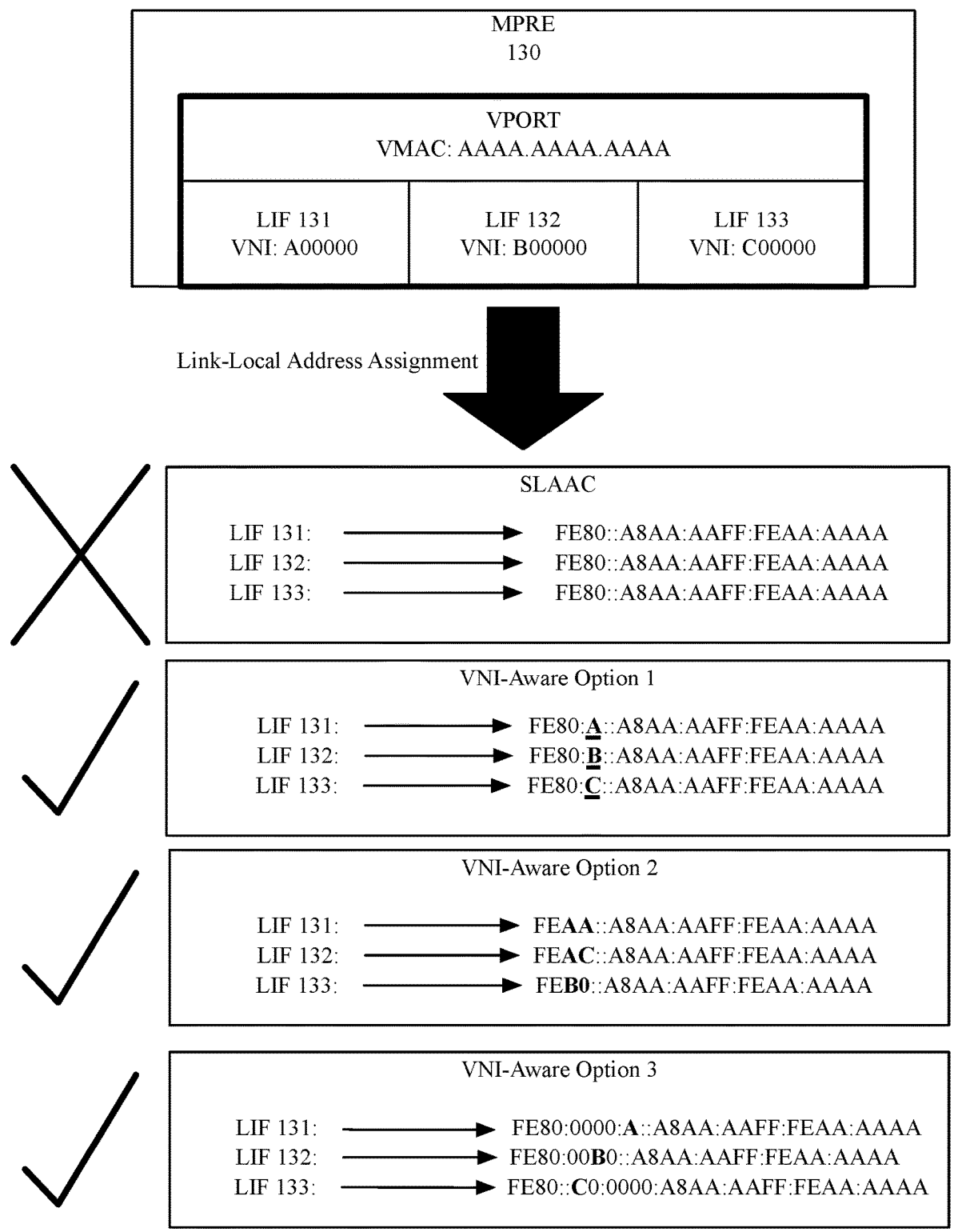
FIG. 3 illustrates multiple methods for assigning link-local IPv6 addresses.

FIG. 3 illustrates multiple methods for assigning link-local IPv6 addresses. FIG. 3 illustrates a set of link-local addresses assigned according to SLAAC that cannot be used in the embodiment of FIG. 2 along with three VNI-aware addressing options. As noted above, the SLAAC option produces three identical link-local addresses that would be valid on the local link (e.g., logical switch) but would not uniquely identify an interface at the MPRE. As such SLAAC cannot be used to assign addresses to the logical interfaces of MPRE 130. VNI-aware option 1 reflects a link-local address assignment that inserts the VNI after the first 16 bits (i.e., after FE80). The notation is the standard notation for IPv6 addresses in which at most one string of "0"s is represented as "::" with the understanding that the "0"s fill any space left by the specified bits. The link-local address of LIF 131 with VNI A00000 and common VMAC AAAA.AAAA.AAAA therefore becomes FE80:A::A8AA: AAFF:FEAA:AAAA, the link-local address of LIF 132 with VNI B00000 and common VMAC AAAA.AAAA.AAAA therefore becomes FE80:B::A8AA:AAFF:FEAA:AAAA, and the link-local address of LIF 133 with VNI C00000 and common VMAC AAAA.AAAA.AAAA therefore becomes FE80:C::A8AA:AAFF:FEAA:AAAA.

VNI-aware option 2 reflects link-local addresses assigned by putting the 24-bit VNI immediately after the first 10 bits (i.e., 1111 1110 10). Such that the link local address for logical interfaces 131, 132, and 133 are: FEAA::A8AA: AAFF:FEAA:AAAA, FEAC::A8AA:AAFF:FEAA:AAAA, and FEB0::A8AA:AAFF:FEAA:AAAA respectively. In this case, the hexadecimal representation does not begin with "FE80" however the link-local prefix is only 10 bits long and the addition of the VNI for the different logical networks affects the last two hexadecimal values without affecting the 10 bits that indicate that the address is a link-local address.

As for VNI-aware option 1, VNI-aware option 2 places the VNI in a consistent position (i.e., immediately following the first 10 bits) for different address assignments for different logical interfaces.

VNI-aware option 3 reflects link-local addresses assigned by putting the 24-bit VNI arbitrarily in the available 54 bits of "0"s following the 10-bitlink-local indicator (i.e., FE80 or 1111 1110 10). LIF 131 is assigned a link-local address with the VNI of LIF 131 (i.e., A00000) with a set of 22 "0" bits (for a total of 32 bits including the 10-bitlink-local indicator) before inserting the VNI resulting in a link-local address of FE80:0000:A::A8AA:AAFF:FEAA:AAAA. LIF 132 is assigned a link-local address with the VNI of LIF 132 (i.e., B00000) with a set of 14 "0" bits (for a total of 24 bits including the 10-bitlink-local indicator) before inserting the VNI resulting in a link-local address of FE80:00B0::A8AA:AAFF:FEAA:AAAA. LIF 133 is assigned a link-local address with the VNI of LIF 133 (i.e., C00000) with a set of 30 "0" bits (for a total of 40 bits including the 10-bitlink-local indicator) before inserting the VNI resulting in a link-local address of FE80::C0:0000:A8AA:AAFF:FEAA:AAAA. As can be seen from VNI-aware option 3 the placement of the VNI within the middle 54 "0"s is arbitrary in some embodiments and may be consistent across link-local address assignments, as in VNI-aware option 2, or inconsistent, as in VNI-aware option 3.

Figure 4:
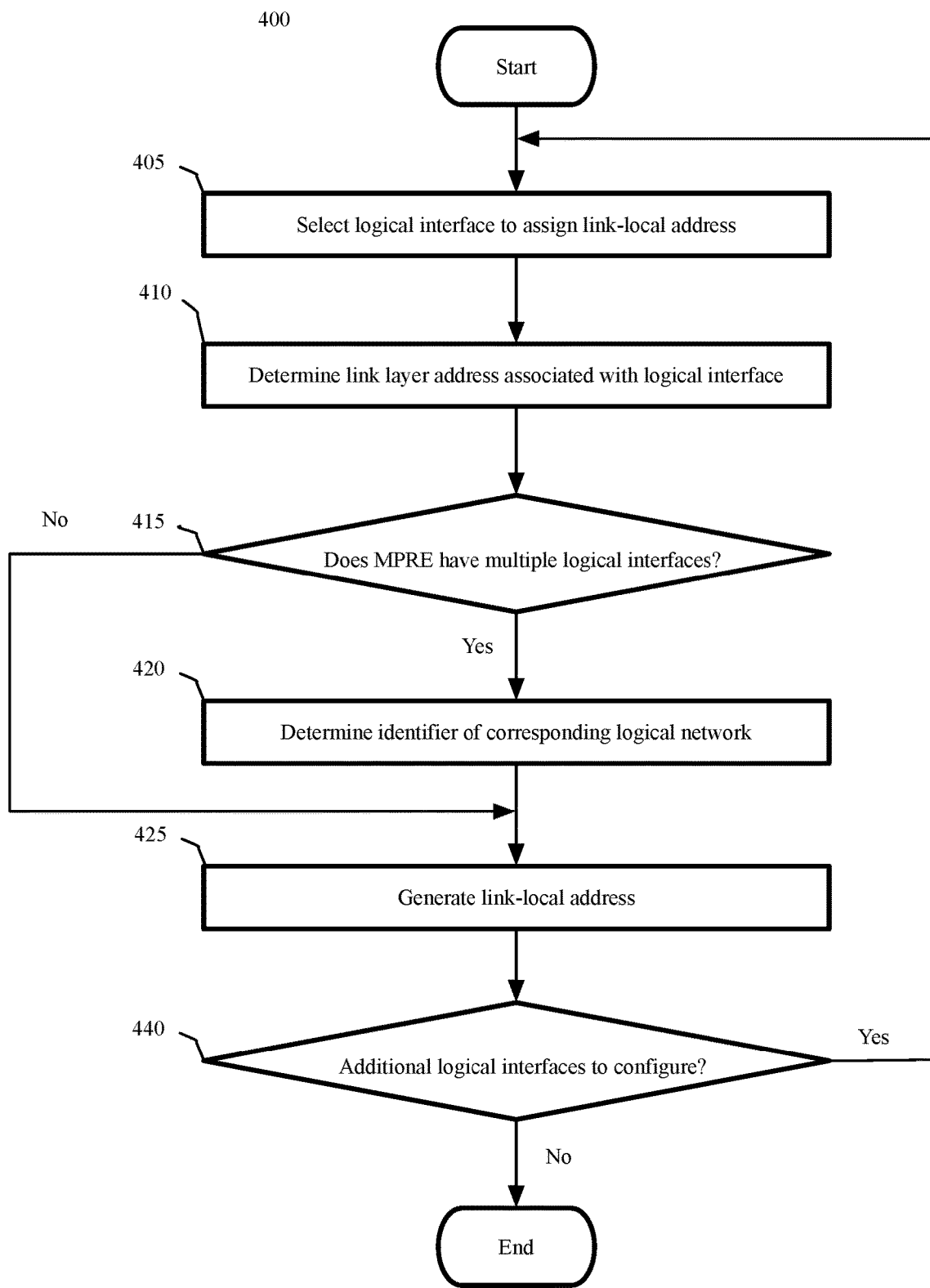
FIG. 4 conceptually illustrates a process for assigning link-local IPv6 addresses to logical interfaces for different logical networks that share a same MAC address.

FIG. 4 conceptually illustrates a process 400 for assigning link-local IPv6 addresses to logical interfaces for different logical networks that share a same MAC address. Process 400, in some embodiments is performed by a logical router or MPRE (e.g., MPRE 130) implementing a set of logical routers, in other embodiments, a set of controllers is responsible for assigning link-local addresses and performs process 400. Process 400 begins (at 405) by selecting a logical interface to which to assign a link-local address. The process determines (at 410) the link layer address (e.g., the MAC address) for assigning the link-local address. In both the SLAAC and VNI-aware link-local address assignment protocols, the link layer address is used to assign the IPv6 link-local address.

The process continues by determining (at 415) whether the MPRE has additional logical interfaces using the same link layer address (e.g., the virtual MAC address of the shared MPRE port). If the process determines (at 415) that the MPRE does not have multiple interfaces using a same link layer the process proceeds to generate (at 425) a link-local address. When multiple logical interfaces do not use the same link layer address the link-local address generation does not need to incorporate further distinguishing information and, in some embodiments, the link-local address is generated using the link layer address and the link-local prefix (e.g., using SLAAC). In some embodiments, the determination (at 415) is omitted to allow for subsequent additional interfaces as the novel link-local address is a valid link-local address.

If the process determines (at 415) that the MPRE does have multiple logical interfaces using a same link layer address, the process determines (at 420) an identifier of a logical network associated with the logical interface selected (at 405) for link-local address assignment. In some embodiments, the logical network identifier is a virtual network identifier (VNI) associated with one of a virtual local area network (VLAN) (e.g., a 12-bit VNI) and a virtual extensible LAN (VXLAN) (e.g., a 24-bit VNI). In other embodiments, any identifier of a logical network can be identified and used to distinguish the logical interface from other logical interfaces. For example, in embodiments that assign different IP addresses to each logical interface, the IP address (or a network prefix of the IP address) can be used in place of the VNI.

Once the identifier has been identified (at 420), the process generates (at 425) a link-local address based on the link layer (e.g., MAC) address and the identified logical network identifier. As discussed above, the generated link-local addresses in some embodiments, include a first 10 bits (e.g., FE80, 1111 1110 10) that indicate that it is a link-local address with the identified logical network identifier inserted into the following 54 bits that are normally populated by "0"s. As discussed above, the logical network identifier (e.g., a VNI), in some embodiments, is included immediately after the first 10 bits. In some embodiments, the logical network identifier is included at an arbitrary location in the 54 bits between the 10 bits that identify the address as a link-local address and the 64 bits of the modified EUI-64. As discussed above, the positioning of the VNI for any individual logical interface is arbitrary and, in some embodiments, is different for different logical interfaces.

Once the link-local address is generated (at 425), the process determines (at 440) whether additional logical interfaces must be configured. In some embodiments, this determination is based on identifying the number of logical interfaces (e.g., at 415) and determining whether each identified logical interface has been assigned a link-local address. If the process determines (at 440) that additional logical interfaces need link-local address assignment, the process returns to 405 to identify the logical interface for which it will assign a link-local address. If the process determines (at 440) that there are no additional logical interfaces that require configuration (i.e., link-local address assignment), the process ends.

Generated link-local addresses, in some embodiments, are advertised (e.g., distributed) using standard IPv6 protocols (e.g., unsolicited neighbor advertisement (NA), NA in response to a neighbor solicitation (NS), etc.) and verified using duplicate address detection (DAD) or other similar protocols. As part of the advertisement, some embodiments, receive data messages (e.g., NS) from other nodes (e.g., network elements, such as VMs, routers, containers, etc.) on the local link indicating the link-local address and a layer 2 address (e.g., MAC address) of the other nodes. A controller set, in some embodiments, distributes the generated link-local addresses to the other network elements. In some embodiments, this information is used to populate a routing table of the MPRE. The link-local addresses are stored in the same way that a standard link-local address is stored in a router. In some embodiments, the link-local address is stored in a routing table, while in others it is separate from a routing table because the link-local addresses are not used for routing.

Figure 5:
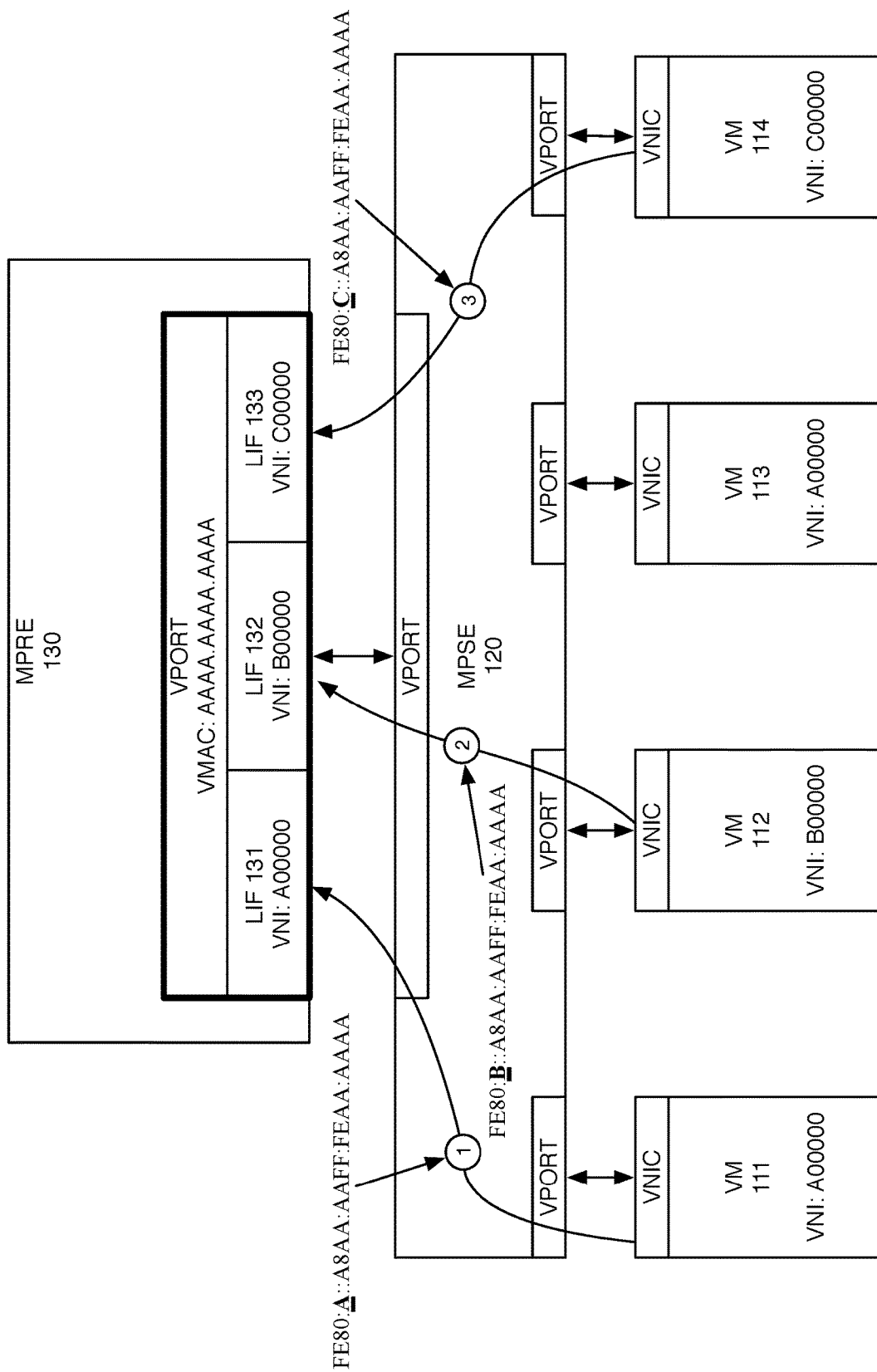
FIG. 5 illustrates different VMs addressing the different interfaces of an MPRE executing on the same host computer using different link-local addresses.

FIG. 5 illustrates different VMs addressing the different interfaces of an MPRE executing on the same host computer using different link-local addresses. FIG. 5 illustrates the MPRE 130, MPSE 120, and VMs 111-114 with associated virtual ports (vports) and virtual network interface cards (VNICs). Each VM 111-114 is associated with a particular logical network and communicates with the logical interface for its associated logical network. After process 400 has been performed (by the MPRE or a controller responsible for assigning IPv6 link-local addresses), each VM will be made aware of a link-local address for the logical interface through, in some embodiments, a standard discovery or advertisement protocol (e.g., a neighbor discovery protocol, etc.).

FIG. 5 illustrates data messages '1', '2', and '3' that are sent by VMs 111, 112, and 114 to the logical interfaces for their respective logical networks using the destination link-local address indicated in FIG. 5. As shown, VM 111 that belongs to the logical network identified by VNI A00000, sends data message '1' to logical interface 131 using the link-local address generated for LIF 131 (i.e., FE80:A::A8AA:AAFF:FEAA:AAAA) and the data message is processed by LIF 131 without any modification of the link-local destination address. VM 113 uses the same link-local address as is used by VM 111 to communicate with LIF 131 because it is in the same logical network but is not shown for clarity. Similarly, data messages '2' and '3' are sent by VMs 112 and 114 respectively with respective link-local addresses FE80:B::A8AA:AAFF:FEAA:AAAA and FE80:C::A8AA:AAFF:FEAA:AAAA. Data messages '2' and '3' are received at LIF 132 and LIF 133 respectively based on the destination link-local address of the data message.

Figure 6:
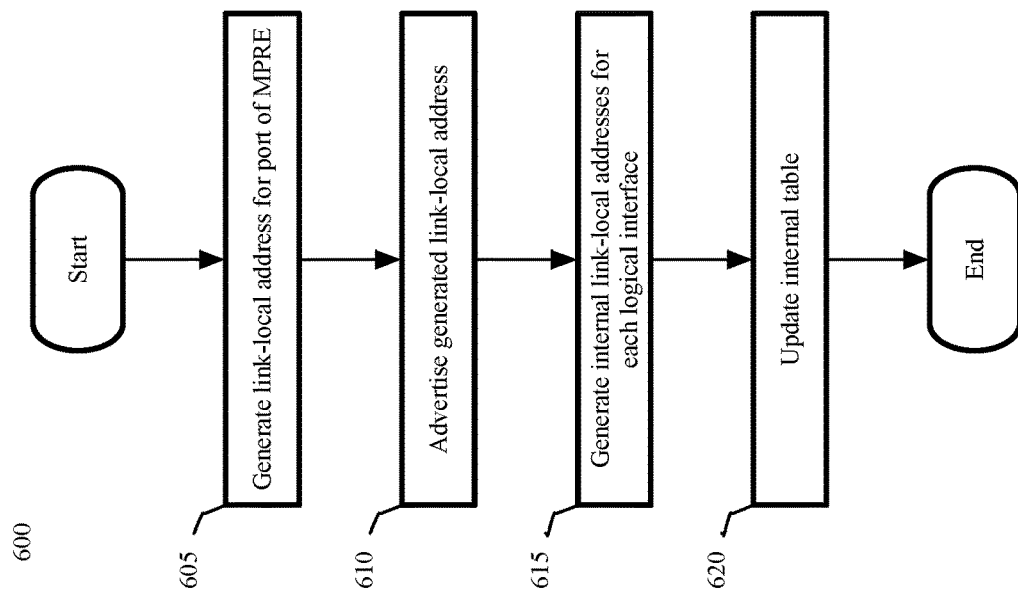
FIG. 6 conceptually illustrates a process for assigning internal link-local IPv6 addresses to logical interfaces for different logical networks.

Alternatively, FIG. 6 conceptually illustrates a process 600 for assigning internal link-local IPv6 addresses to logical interfaces for different logical networks that share a same MAC address. Process 600, in some embodiments is performed by a logical router or MPRE implementing a set of logical routers, in other embodiments, a set of controllers is responsible for assigning link-local addresses and performs process 600. Process 600 begins (at 605) by generating a link-local address for the single port of the MPRE using the shared link layer address (e.g., VMAC AAAA.AAAA.AAAA). The generated link-local address, in some embodiments, is based on the modified EUI-64 (e.g., FE80::A8AA:AAFF:FEAA:AAAA). In some embodiments, the address is generated automatically by SLAAC.

Once the link-local address based on the shared link layer address is generated (at 605) the generated address is advertised (at 610) to the nodes connected to the logical interfaces through a logical L2 domain (e.g., a logical switch associated with the logical interface). In some embodiments, the generated address is advertised (e.g., as a neighbor advertisement (NA)) in response to a neighbor solicitation (NS) from a router or other network element (e.g., node). The NS is part of a neighbor resolution performed by a router or other network element and the NA includes the generated address in a source address field to be extracted by the router or network element as part of a process for learning IPv6 link-local addresses. Alternatively, the advertisement of the shared link-local address, in some embodiments, uses a standard IPv6 advertisement protocol as discussed above (e.g., unsolicited NA). The other nodes of the local links are then capable of addressing the port of the MPRE associated with the link-local address.

Either before or after advertising (at 610) the generated address, link-local addresses for the logical interfaces are generated (at 615). In some embodiments, the link-local addresses are generated using process 400. As described above, there are multiple possible ways to assign the link-local addresses to include the VNI associated with the logical interface, and process 600 uses at least one of them in a particular embodiment. In some embodiments, the location at which the VNI is inserted is consistent for all logical interfaces to allow for ease of identifying the logical interface associated with a particular data message.

Once the additional link-local addresses are generated (at 615) and the link-local address generated for the shared link layer address is advertised (at 610), an internal table is updated (at 620) to include the link-local addresses generated for each logical interface. In some embodiments, the internal table is a routing table, in other embodiments, the updated table is a table that is separate from the routing table and is used to identify the destination of a data message addressed to the shared link-local address as described below in FIG. 7.

Figure 7:
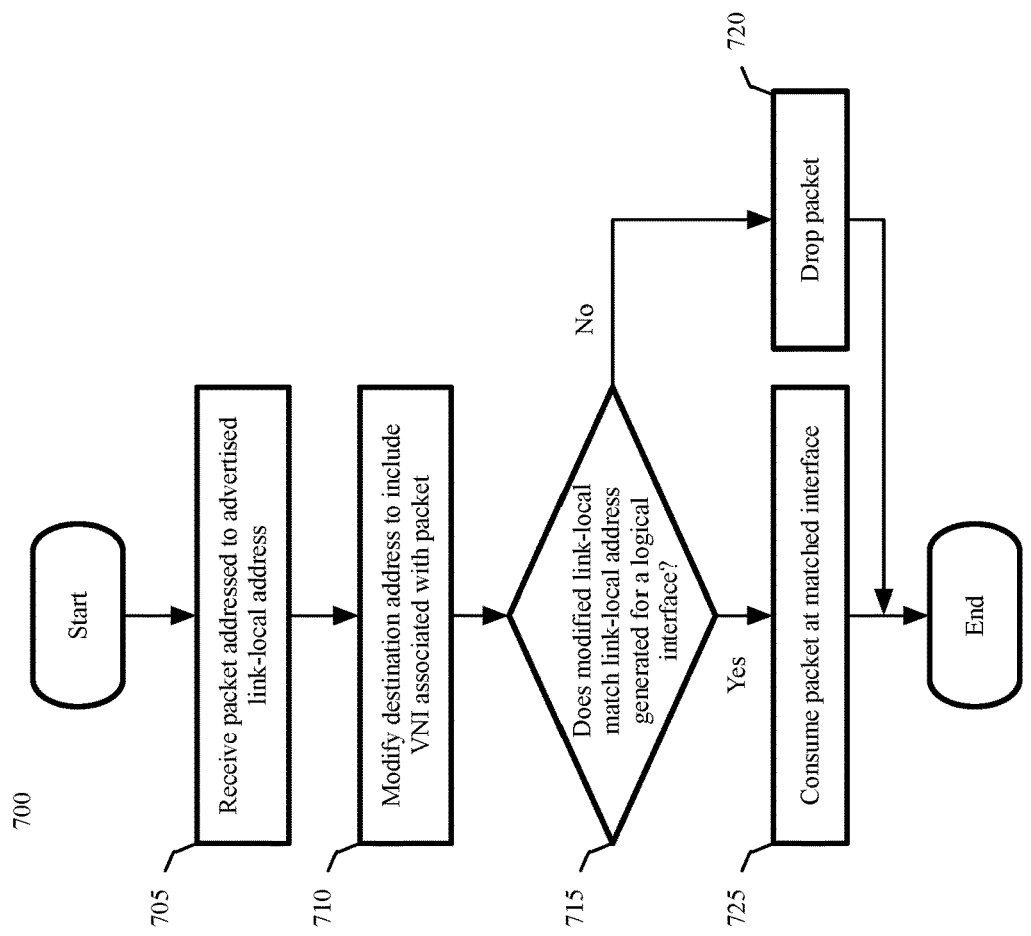
FIG. 7 conceptually illustrates a process for identifying a destination logical interface for a data message addressed to a shared link-local destination address and processing the data message at the correct logical interface.

FIG. 7 conceptually illustrates a process 700 for identifying a destination logical interface for a data message addressed to a shared link-local destination address and processing the data message at the correct logical interface. Process 700, in some embodiments, is performed by an MPRE (e.g., MPRE 130) as part of the ingress pipeline for received data messages. In some embodiments, process 700 is part of an ingress pipeline for IPv6 data messages but not IPv4 data messages. Process 700 begins when a data message (e.g., a packet) addressed to the advertised link-local address associated with the shared link layer address is received (at 705) by, for example, the vport of MPRE 130. The received data message, in some embodiments, is one of an internet control message protocol (ICMP) data message, a neighbor discovery protocol (NDP) data message, and a dynamic host configuration protocol version 6 (DHCPv6) data message. In some embodiments, the data message is any data message directed to the interface (e.g., an SSH or TCP (e.g., SYN) data message).

Because the data message is addressed to the common link-local address, the router modifies (at 710) the destination link-local address to determine the particular interface to which the data message is destined. The modification, in some embodiments, includes inserting the VNI associated with the received data message into the link-local destination address at the location to which the VNI is added as part of generating (at 615) the link-local addresses for each logical interface. The modified link-local address, in some embodiments, includes the VNI at one of, (1) immediately after the 10 bits indicating that the address is a link-local address, (2) immediately before the modified EUI-64, and (3) at an arbitrary location in the 54 "0" bits between the bits indicating that the address is a link-local address and the last 64 bits of the modified EUI-64.

Once the link-local destination address has been modified (at 710), the modified link-local address is compared (at 715) to the generated link-local addresses for each of the logical interfaces to identify the destination logical interface. If no link-local address generated for a logical interface matches the modified link-local address, the data message is dropped (at 720) and the process ends. If, however, the modified link-local address matches a particular link-local address generated for a particular logical interface, the data message is consumed (e.g., processed) (at 725) by the particular logical interface and the process ends. In some embodiments, consuming data messages includes responding to the received data message (e.g., responding to neighbor solicitation, etc.).

Figure 8:
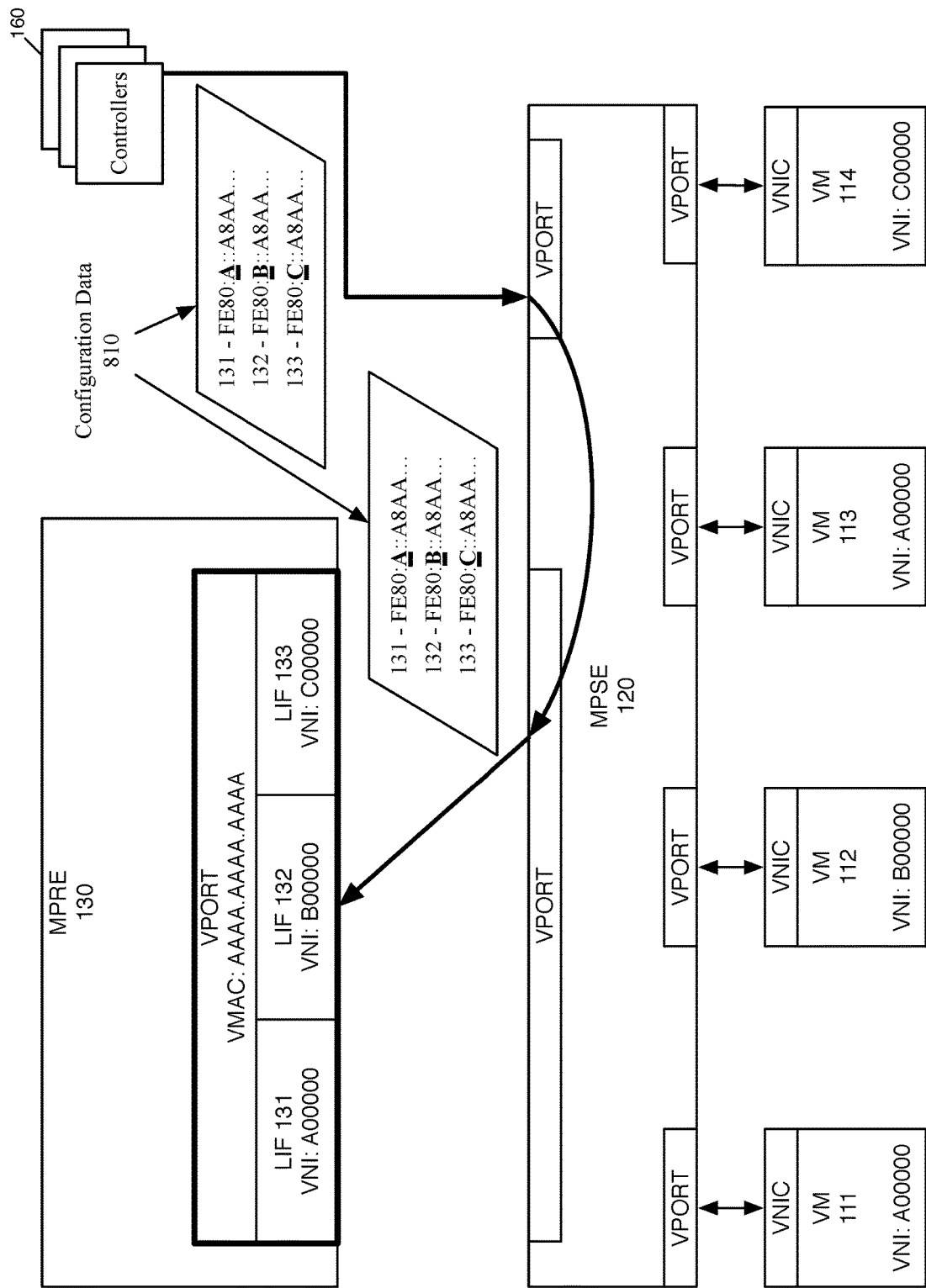
FIG. 8 illustrates a set of controllers providing configuration data that includes a set of link-local addresses generated by the set of controllers and the associated LIFs.

FIG. 8 illustrates a set of controllers 160 providing configuration data 810 that includes a set of link-local addresses generated by the set of controllers 160 and the associated LIFs 131-133. In some embodiments, the communication is through the MPSE 120, while in other embodiments, the set of controllers 160 has a separate control channel for communicating with MPRE 130 (e.g., through controller agent 140 of FIG. 1). In the illustrated embodiment, the configuration data 810 includes an association between a LIF and an assigned link-local address. Other embodiments include additional information relating to multicast groups associated with the generated link-local addresses that the MPRE or logical interface needs to join in order to ensure proper functionality under IPv6. The configuration data 810, in some embodiments, is used to configure each logical interface to advertise the associated generated link-local address, while in other embodiments, the configuration data 810 is used to configure the internal table of the MPRE. As noted above the controller set may perform the processes 400 or 600 to configure the MPRE with link-local addresses of the logical interfaces.

Figure 9:
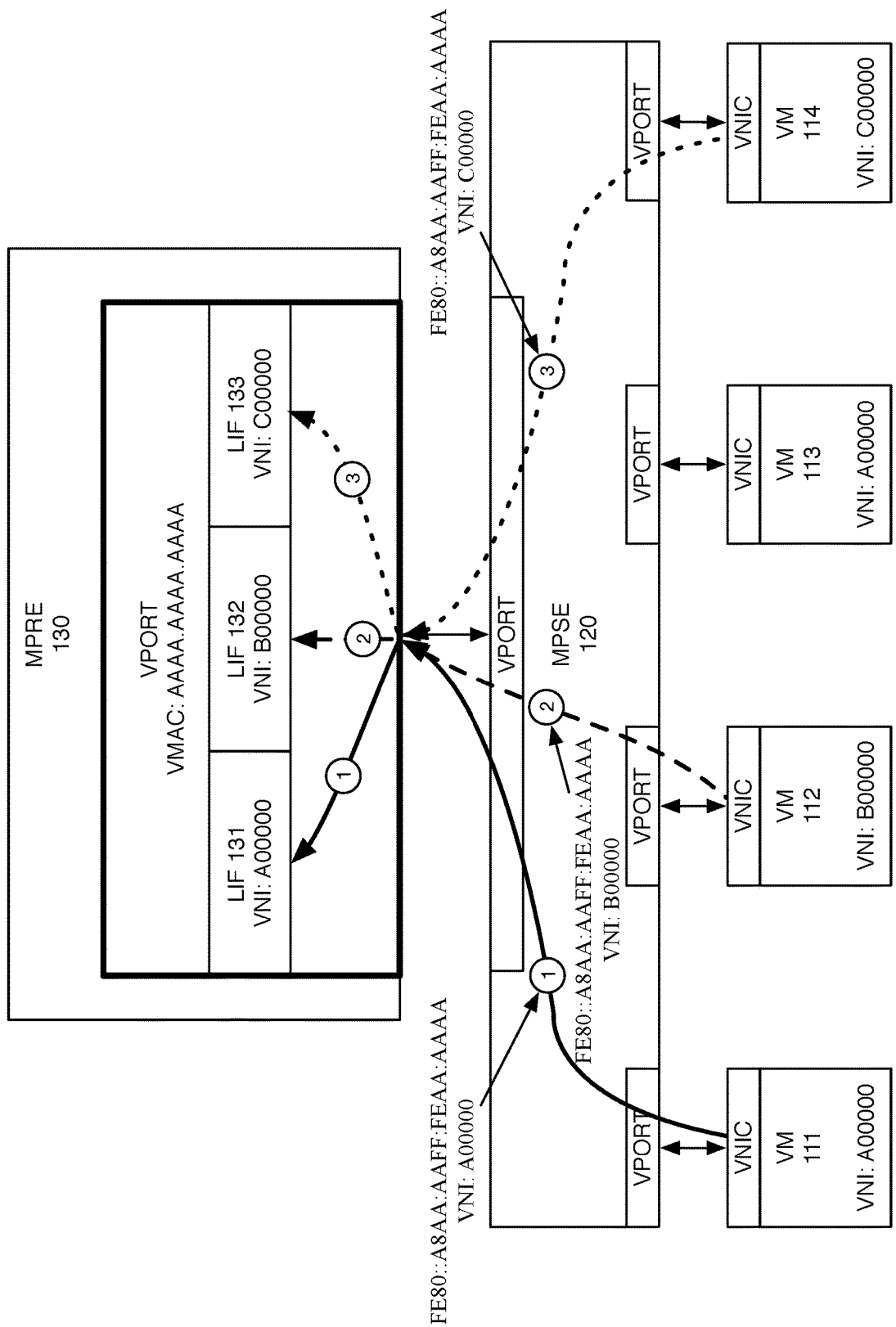
FIG. 9 illustrates different VMs addressing the different interfaces of an MPRE executing on the same host computer using a same link-local addresses.

FIG. 9 illustrates different VMs addressing the different interfaces of an MPRE executing on the same host computer using a same link-local address. FIG. 9 illustrates the MPRE 130, MPSE 120, and VMs 111-114 with associated virtual ports (vports) and virtual network interface cards (VNICs). Each VM 111-114 is associated with a particular logical network and communicates with the logical interface for its associated logical network. After process 600 has been performed (by the MPRE or a controller responsible for assigning IPv6 link-local addresses), each VM will be made aware of a link-local address for the logical interface (i.e., the common link-local address of the MPRE vport) through, in some embodiments, a standard discovery or advertisement protocol (e.g., a neighbor discovery protocol, etc.). In the embodiment of FIG. 9, the link-local address for the logical interface used by each VM 111-114 is the same link-local address (i.e., the link-local address associated with the MAC address of the vport of the MPRE 130)

FIG. 9 illustrates data messages '1', '2', and '3' that are sent by VMs 111, 112, and 114 to the logical interfaces for their respective logical networks using the destination link-local address and associated with a VNI indicated in FIG. 9. As shown, VM 111 that belongs to the logical network identified by VNI A00000, sends data message '1' to logical interface 131 using the shared link-local address (i.e., FE80:: A8AA:AAFF:FEAA:AAAA) and the VNI for the logical network over which it is sending the data message. The VNI, in some embodiments, is not included in the data message sent by the VM but is instead associated with the data message while processing the data message at MPSE 120. In some embodiments, the VNI is indicated in an encapsulation header of the data message that is included either at the VNIC associated with the source VM or the MPSE 120. The data message is received at the vport of the MPRE 130 and is then processed as described in FIG. 7 (at 710 and 715). Once it has been determined that the modified address (e.g., FE80:A::A8 . . . , FEAA::A8 . . . , or FE80:0000: A::A8 . . . with the last 14 common hexadecimal values omitted) is associated with logical interface 131, data message '1' is processed (e.g., consumed) by LIF 131. VM 113 uses the same shared link-local address to communicate with LIF 131 but is not shown for clarity as it is processed in the same way as data message '1'.

Similarly, data messages '2' and '3' are sent by VMs 112 and 114 respectively with link-local address FE80::A8AA: AAFF:FEAA:AAAA and associated VNIs B00000 and C00000 respectively. Data messages '2' and '3' are received at the vport of MPRE 130 based on the shared destination link-local address of the data message. Data messages '2' and '3' have their destination link-local address modified to incorporate the associated VNI according to the same algorithm or process used to generate the link-local addresses for the different logical interfaces. Once it has been determined that a modified address (e.g., FE80:B::A8 . . . , FEAC::A8 . . . , or FE80:0000:B::A8 . . . for data message '2', and FE80:C::A8 . . . , FE80::A8 . . . , or FE80:0000: C::A8 . . . for data message '3', each with the last 14 common hexadecimal values omitted) is associated with a particular logical interface (e.g., LIF 132 for data message '2' and LIF 133 for data message '3') the data message is processed (e.g., consumed) by the identified LIF.

Figure 10:
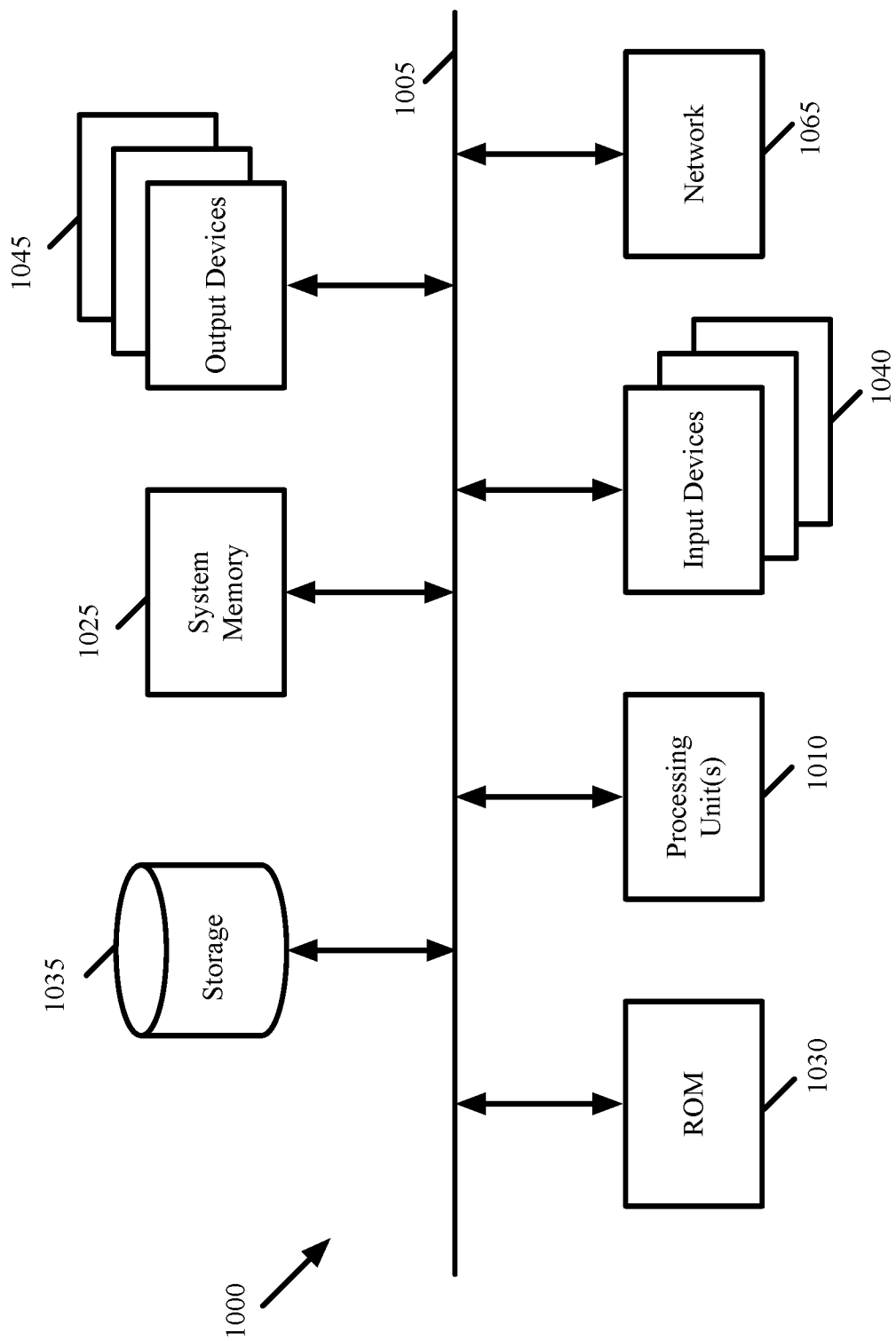
FIG. 10 conceptually illustrates a computer system with which some embodiments of the invention are implemented.

FIG. 10 conceptually illustrates a computer system 1000 with which some embodiments of the invention are implemented. The computer system 1000 can be used to implement any of the above-described hosts, controllers, and managers. As such, it can be used to execute any of the above described processes. This computer system includes various types of non-transitory machine readable media and interfaces for various other types of machine readable media. Computer system 1000 includes a bus 1005, processing unit(s) 1010, a system memory 1025, a read-only memory 1030, a permanent storage device 1035, input devices 1040, and output devices 1045.

The bus 1005 collectively represents all system, peripheral, and chipset buses that communicatively connect the numerous internal devices of the computer system 1000. For instance, the bus 1005 communicatively connects the processing unit(s) 1010 with the read-only memory 1030, the system memory 1025, and the permanent storage device 1035.

From these various memory units, the processing unit(s) 1010 retrieve instructions to execute and data to process in order to execute the processes of the invention. The processing unit(s) may be a single processor or a multi-core processor in different embodiments. The read-only-memory (ROM) 1030 stores static data and instructions that are needed by the processing unit(s) 1010 and other modules of the computer system. The permanent storage device 1035, on the other hand, is a read-and-write memory device. This device is a non-volatile memory unit that stores instructions and data even when the computer system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1025 is a read-and-write memory device. However, unlike storage device 1035, the system memory is a volatile read-and-write memory, such a random access memory. The system memory stores some of the instructions and data that the processor needs at runtime. In some embodiments, the invention's processes are stored in the system memory 1025, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the computer system. The input devices 1040 include alphanumeric keyboards and pointing devices (also called "cursor control devices"). The output devices 1045 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples computer system 1000 to a network 1065 through a network adapter (not shown). In this manner, the computer can be a part of a network of computers (such as a local area network ("LAN"), a wide area network ("WAN"), or an Intranet, or a network of networks, such as the Internet. Any or all components of computer system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory machine readable medium storing a program for assigning a unique internet protocol version 6 (IPv6) link-local address to each interface of a software router implementing a plurality of logical interfaces for a corresponding plurality of logical networks, the program for execution by a set of processing units, the program comprising sets of instructions for:

for each logical interface,
determining an identifier of the corresponding logical network;
based on the identifier, generating an IPv6 link-local address for the logical interface including the identifier of the corresponding logical network; and
distributing the generated IPv6 link-local address to other local network elements in the corresponding logical network for the other local network elements to use to address the logical interface.

2. The non-transitory machine readable medium of claim 1, wherein the identifier is a virtual network identifier (VNI).

3. The non-transitory machine readable medium of claim 2, wherein the VNI is one of a virtual local area network (VLAN) identifier and a virtual extensible local area network identifier.

4. The non-transitory machine readable medium of claim 3, wherein, a VLAN identifier is a 12-bit identifier and a VXLAN identifier is a 24-bit identifier.

5. The non-transitory machine readable medium of claim 1, wherein each logical interface uses a same, shared MAC address.

6. The non-transitory machine readable medium of claim 5, wherein the generated IPv6 link-local address for each logical interface comprises:
a first set of 10 bits indicating that the generated address is a link-local address;
a last set of bits based on the shared MAC address of the logical interface;
a set of bits between the first and last sets of bits based on the identifier of the corresponding logical network.

7. The non-transitory machine readable medium of claim 6, wherein the last set of bits is a set of 64 bits comprising a 64-bit modified extended unique identifier (modified EUI-64) comprising the first 24 bits of the shared MAC address with the seventh bit toggled followed by the hexadecimal values FFFE followed by the last 24 bits of the MAC address.

8. The non-transitory machine readable medium of claim 6, wherein the set of bits between the first and last sets of bits is a virtual network identifier (VNI) of the corresponding logical network immediately following the first set of 10 bits.

9. The non-transitory machine readable medium of claim 6, wherein the set of bits between the first and last sets of bits is a virtual network identifier (VNI) of the corresponding logical network immediately preceding the last set of bits based on the shared MAC address of the logical interface.

10. The non-transitory machine readable medium of claim 6, wherein the set of bits between the first and last sets of bits is a virtual network identifier (VNI) of the corresponding logical network located at a same arbitrary location between the first and last sets of bits for each generated link-local address.

11. The non-transitory machine readable medium of claim 6, wherein the set of bits between the first and last set of bits is a virtual network identifier (VNI) of the corresponding logical network located at an arbitrary location between the first and last sets of bits for each generated link-local address, wherein at least first and second generated link-local addresses for first and second logical interfaces use a different location for the VNI.

12. The non-transitory machine readable medium of claim 1 further comprising sets of instructions for:
receiving, at the software router, a data message directed to a logical interface of the software router;

comparing the IPv6 link-local address to the generated IPv6 link-local addresses for the different logical interfaces to determine the logical interface to which the data message is addressed.

13. The non-transitory machine readable medium of claim 12, wherein the received data message is one of internet control message protocol (ICMP) data message, a neighbor discovery protocol (NDP) data message, and a dynamic host configuration protocol version 6 (DHCPv6) data message.

14. A method for assigning a unique internet protocol version 6 (IPv6) link-local address to each interface of a software router implementing a plurality of logical interfaces for a corresponding plurality of logical networks, the method comprising:
for each logical interface,
determining an identifier of the corresponding logical network;
based on the identifier, generating an IPv6 link-local address for the logical interface including the identifier of the corresponding logical network; and
distributing the generated IPv6 link-local address to other local network elements in the corresponding logical network for the other local network elements to use to address the logical interface.

15. The method of claim 14, wherein the identifier is one of a virtual local area network (VLAN) identifier and a virtual extensible local area network (VXLAN) identifier.

16. The method of claim 14, wherein each logical interface uses a same, shared MAC address and the generated IPv6 link-local address for each logical interface comprises:
a first set of 10 bits indicating that the generated address is a link-local address;
a last set of bits based on the shared MAC address of the logical interface;
a set of bits between the first and last sets of bits based on the identifier of the corresponding logical network.

17. The method of claim 16, wherein the last set of bits is a set of 64 bits comprising a 64-bit modified extended unique identifier (modified EUI-64) comprising the first 24 bits of the shared MAC address with the seventh bit toggled followed by the hexadecimal values FFFE followed by the last 24 bits of the MAC address.

18. The method of claim 16, wherein the set of bits between the first and last sets of bits is a virtual network identifier (VNI) of the corresponding logical network located at a same arbitrary location between the first and last sets of bits for each generated link-local address.

19. The method of claim 14 further comprising:
receiving, at the software router, a data message directed to a logical interface of the software router;
comparing the IPv6 link-local address to the generated IPv6 link-local addresses for the different logical interfaces to determine the logical interface to which the data message is addressed.

20. The method of claim 19, wherein the received data message is one of internet control message protocol (ICMP) data message, a neighbor discovery protocol (NDP) data message, and a dynamic host configuration protocol version 6 (DHCPv6) data message.

* * * * *